Oct. 30, 1962 — B. B. BERRY, JR., ETAL — 3,061,252
CABLE RETRACTOR
Filed July 10, 1961 — 2 Sheets-Sheet 1
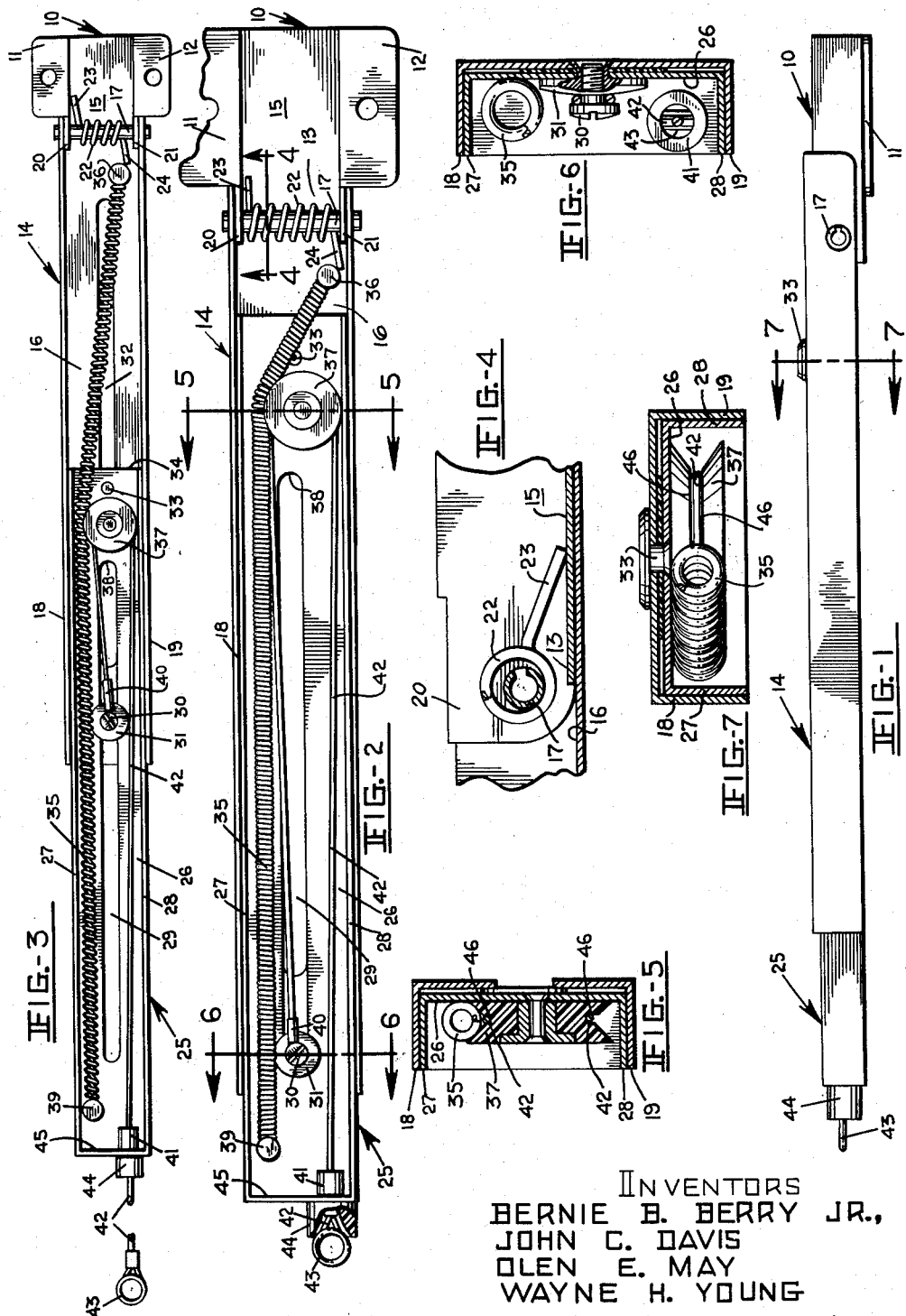
INVENTORS
BERNIE B. BERRY JR.,
JOHN C. DAVIS
OLEN E. MAY
WAYNE H. YOUNG
BY Herbert Q. Winturn
ATTORNEY

United States Patent Office 3,061,252
Patented Oct. 30, 1962

3,061,252
CABLE RETRACTOR
Bernie B. Berry, Jr., John C. Davis, Olen E. May, and Wayne H. Young, Indianapolis, Ind., assignors to General Devices Co., Inc., Indianapolis, Ind., a corporation of Indiana
Filed July 10, 1961, Ser. No. 125,914
4 Claims. (Cl. 248—54)

There are certain situations where electric circuits are required to be carried through cables to devices which are shiftable in positions, and it is not desirable that the cable be permitted to drag over the shiftable member in the change from one position to another thereof. The purpose of this invention is to provide a structure which will support a loop of the cable and automatically shift with the movement of the shiftable member to hold the cable above the shifting member at all times.

A primary advantage of the invention resides in the fact that the cable holder or what may properly be termed a retractor is normally out of the way when the shiftable member is in an initial position, and then will automatically rock and extend itself under the pull of the cable as the shiftable member is carried toward a shifted position.

One primary usage of the invention will be found in what may be termed electronic cabinets where one or more chassis may be slidingly carried within the cabinet in the nature of a drawer and be pulled outwardly a distance therefrom for inspection, repair, or even replacement. In such cabinets, the circuit cables will be carried upwardly within the cabinet and to one side and preferably to the rear of the backsides of the chassis, and a loop will be provided in the cable whereby there is sufficient length of cable in that loop to permit the chassis to be withdrawn in part from the cabinet without any disconnection of the cable therefrom.

A further important object of the invention resides in the simplicity of the construction embodying the invention, and in its relatively low cost of production as well as in its long lasting life.

These and many other objects and advantages of the invention will become apparent to those versed in the art in the following description of one particular form of the invention as illustrated in the accompanying drawings, in which FIG. 1 is a view in top plan of a structure embodying the invention;

FIG. 2 is a view in side elevation on an enlarged scale;

FIG. 3 is a like view in side elevation but on a smaller scale and with the device in an extended condition;

FIG. 4 is a detail in horizontal section on the line 4—4 on an enlarged scale in FIG. 2;

FIG. 5 is a detail in vertical section on an enlarged scale on the line 5—5 in FIG. 2;

FIG. 6 is a vertical section on a slightly enlarged scale on the line 6—6 in FIG. 2;

FIG. 7 is a detail in vertical section on a slightly enlarged scale on the line 7—7 in FIG. 1.

Figure 8:
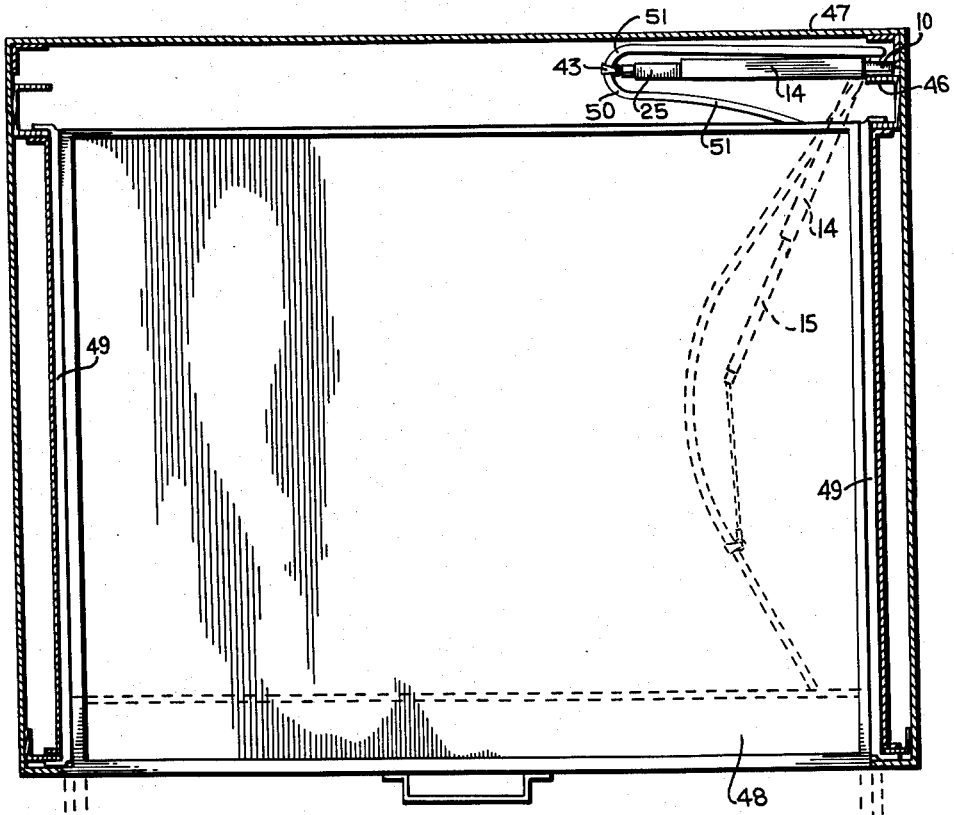
FIG. 8 is a horizontal transverse section through a cabinet to which the invention is applied.

A mounting bracket generally indicated by the numeral 10 is channel shaped with outwardly extending attaching ears 11 and 12.

This bracket 10 has an end portion 13 which slidingly telescopes within an end portion of a channel iron 14. The web 15 of the bracket 10 throughout the forward portion 13 bears against the web 16 of the channel iron 14. The channel iron 14 is rockably attached to the bracket 10 by means of a split tubular pin 17 which extends through the legs 18 and 19 of the channel bar 14 and rockably through the legs 20 and 21 of the bracket 10. A torsional spring 22 wraps around the pin 17 between the bracket legs 20 and 21 and has the terminal ends 23 and 24 bearing respectively against the bracket web 15 and the channel bar web 16, normally holding the bracket 10 with its web 15 yieldingly pressed against the web 16, and permitting the channel bar 14 to rock in one direction in overcoming the torsional force of the spring 22.

A second channel bar 25 is slidingly fitted within the channel bar 14, to ride by its web 26 over the web 16, and with its legs 27 and 28 riding against the opposing faces of the legs 18 and 19 of the bar 14. This channel bar 26 has a longitudinally extending central slot therethrough, 29, and a retaining member such as a screw 30 is fixed to the web 16, extending through the slot 29, and through a retaining washer 31 on the outside of the web 26.

The channel bar 14 has a longitudinally centrally disposed slot 32, and any connecter member such as a rivet 33 passes through the slot 32 and into the web 26 adjacent the end 34 and is fixed thereto. In this manner, the channel bar 25 is retained on the channel bar 14, and is permitted to slide therealong from such a position as indicated in FIG. 2 to an extended position as indicated in FIG. 3.

The channel bar 25 is normally biased to retracted position along the channel bar 14 by means of an elongated coil spring 35 which has one end fixed to the web 16 by a pin 36 intermediate the end of the web 16 and the position of the end 34 and the pin 17 when the channel bar 25 is fully retracted and the rivet 33 is stopped against the end of the slot 32. This spring 35 extends from the location of the pin 36 to one side of the web 16 diagonally across and over a pulley 37 which is rockably carried on the web 26 of the channel bar 25 between the end 34 and the end 38 of the slot 29. The spring 35 is carried along the length of the channel bar 25 to the end opposite the end 34 where this spring is attached to a pin 39 in turn secured to the web 26.

A flexible cable is secured by an end portion 40 to the screw 30, and extends therefrom along and under the spring 35 around the pulley 37 under the spring 35 and thence back within the channel bar 25 to a sleeve 41, the cable being designated by the numeral 42.

The cable 42 passes through the sleeve 41 and is secured to an eye 43 which is located at the outside ends 44 of the sleeve 41. As will be noted in FIGS. 2 and 3, the sleeve 41 has an enlarged portion on the outside of an end flange 45 which extends across the channel bar 25 between the legs 27 and 28. As indicated in FIG. 5, the cable 42 rides within a restricted groove 46, whereby the spring 35 will retain the cable in position around the pulley 37 without actual contact with the cable 42, FIG. 5.

Operation

Referring now to FIG. 8, the bracket 10 will be mounted upon some structural member 46 extending vertically of the cabinet 47 which is herein shown as being generally rectangular in shape. A tray or drawer 48 which may be a chassis is slidingly mounted on its sides on a track 49 on each side to permit movement of the chassis 48 from a solid line position fully within the cabinet 47 to an extended position as indicated by the dash lines.

A cable 50 is carried upwardly through the cabinet 47 in most instances, and is provided with a loop 51 of sufficient length that it may extend along the channel bars 14 and 25 in their retracted positions, and be secured to the eye 43. The cable will continue around from the eye 43 by the length 51 to the chassis 48 to make the necessary connections therewith.

Upon pulling the chassis 48 outwardly from the cabinet 47, the cable 50 will tend to straighten out its loop 51 and in so doing, will initially swing the channel bars 14 and 25 around to some such position as indicated by the dash lines and upon further travel, the cable will then pull on the cable 42 which will in turn cause the channel bar 25 to travel outwardly along the channel bar 14 to the full extent of travel if required of the channel bar 25 relative to the channel bar 14. Then when the chassis 48 is pushed backwardly into the cabinet 47, the spring 35 will serve to return the channel bar 25 along the channel bar 14, carrying the loop portion 51 of the electric cable in a position to be out of the way of the cabinet and holding it in the upper position so that it will not drop down onto a chassis therebelow as would normally be the case, whereby the cable is then returned to its looped form and held against dropping downwardly.

While we have herein shown and described our invention in the one particular form, it is obvious that structural changes may be employed without departing from the spirit of the invention, and we therefore do not desire to be limited to the precise form beyond the limitations which may be imposed by the following claims.

We claim:

1. A cable retractor comprising a mounting bracket; a first bar hingedly carried by the bracket; spring means between the bracket and said bar resisting swinging of the bar; a second bar longitudinally slidable along the first bar away from and toward said bracket; means retaining the second bar on the first bar; elastic means secured by one end to said first bar adjacent said bracket and by its other end to said second bar at the end thereof remote from said bracket normally retaining the second bar adjacent said bracket and allowing said second bar to travel yieldingly away from said bracket; a length of return cable fixed by one end to said first bar at an end portion remote from said bracket and its other end being disposed at the end of the second bar remote from said bracket; a member carried by said second bar adjacent its end nearest said bracket, and around which member, said return cable is trained intermediate the cable ends; said second bar being shifted by pull of said return cable other end from said second bar, overcoming the resistance to travel of the second bar set up by said elastic means, said elastic means returning the second bar to its said normal position.

2. The structure of claim 1, in which said elastic means consists of a length of coil spring; and said member consists of a revolubly mounted pulley over which said spring is carried along one side of said second bar.

3. The structure of claim 1 in which said two bars each consists of a length of channel iron, said second bar being laterally confined within said first bar; both of said bars being longitudinally slotted; said second bar retaining means comprising a pin member fixed to said first bar adjacent its said remote end and extending through the second bar slot, and a second pin fixed to said second bar at its end nearest said bracket and extending through the slot of the first bar.

4. The structure of claim 1 in which there is a sleeve carried at the remote end of said second bar and through which said return cable other end extends; and there is a stop on the return cable forming an abutment limiting travel of the return cable toward said member; and means on said return cable other end providing an attachment for the cable to be retracted.

References Cited in the file of this patent

UNITED STATES PATENTS

| | | |
|---|---|---|
| 921,970 | Frantz | May 18, 1909 |
| 1,700,741 | May | Feb. 5, 1929 |
| 2,787,433 | Slavsky et al. | Apr. 2, 1957 |
| 2,865,979 | Klassen | Dec. 23, 1958 |